(12) United States Patent
Mikami et al.

(10) Patent No.: US 9,781,337 B2
(45) Date of Patent: Oct. 3, 2017

(54) IMAGE PROCESSING DEVICE, IMAGE PROCESSING METHOD, AND RECORDING MEDIUM FOR TRIMMING AN IMAGE BASED ON MOTION INFORMATION

(71) Applicant: SONY CORPORATION, Tokyo (JP)

(72) Inventors: Masanori Mikami, Kanagawa (JP); Yoko Fukata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 14/652,062

(22) PCT Filed: Nov. 14, 2013

(86) PCT No.: PCT/JP2013/006709
§ 371 (c)(1),
(2) Date: Jun. 12, 2015

(87) PCT Pub. No.: WO2014/097536
PCT Pub. Date: Jun. 26, 2014

(65) Prior Publication Data
US 2015/0319361 A1 Nov. 5, 2015

(30) Foreign Application Priority Data
Dec. 20, 2012 (JP) .................. 2012-277953

(51) Int. Cl.
*H04N 5/232* (2006.01)
*G06K 9/00* (2006.01)
*G06K 9/32* (2006.01)
*G06T 7/215* (2017.01)

(52) U.S. Cl.
CPC ..... *H04N 5/23219* (2013.01); *G06K 9/00221* (2013.01); *G06K 9/3233* (2013.01); *G06T 7/215* (2017.01)

(58) Field of Classification Search
USPC ........................................... 348/169
See application file for complete search history.

(56) References Cited

U.S. PATENT DOCUMENTS

| 5,889,505 | A | * | 3/1999 | Toyama | G06F 3/0325 |
|---|---|---|---|---|---|
| | | | | | 345/156 |
| 6,630,951 | B1 | | 10/2003 | Suzuki | |
| 8,284,992 | B2 | * | 10/2012 | Takamori | G06K 9/00771 |
| | | | | | 348/143 |
| 8,532,191 | B2 | * | 9/2013 | Kim | G06K 9/32 |
| | | | | | 348/169 |
| 2009/0268074 | A1 | | 10/2009 | Sugino | |
| 2009/0295926 | A1 | | 12/2009 | Miyazaki | |
| 2010/0053419 | A1 | * | 3/2010 | Fukui | G06K 9/00234 |
| | | | | | 348/352 |
| 2010/0321503 | A1 | * | 12/2010 | Sakata | G01S 3/7864 |
| | | | | | 348/169 |

(Continued)

FOREIGN PATENT DOCUMENTS

| EP | 0332169 A1 | 9/1989 |
|---|---|---|
| EP | 2219364 A1 | 8/2010 |
| JP | 2008-288797 A | 11/2008 |

*Primary Examiner* — Shahbaz Nazrul
(74) *Attorney, Agent, or Firm* — Chip Law Group

(57) ABSTRACT

An image processing apparatus may include a trimming-decision processing to determine a trimming of an image based on motion information of an object appearing in the image and motion information of the image processing apparatus.

20 Claims, 9 Drawing Sheets

(56) References Cited

U.S. PATENT DOCUMENTS

| | | | |
|---|---|---|---|
| 2011/0279691 A1 | 11/2011 | Ishii | |
| 2012/0020524 A1* | 1/2012 | Ishikawa | H04N 7/183 |
| | | | 382/103 |
| 2012/0294549 A1* | 11/2012 | Doepke | G06T 3/4038 |
| | | | 382/294 |
| 2013/0195374 A1* | 8/2013 | Fukata | G06T 11/60 |
| | | | 382/282 |

* cited by examiner

[Fig. 1]
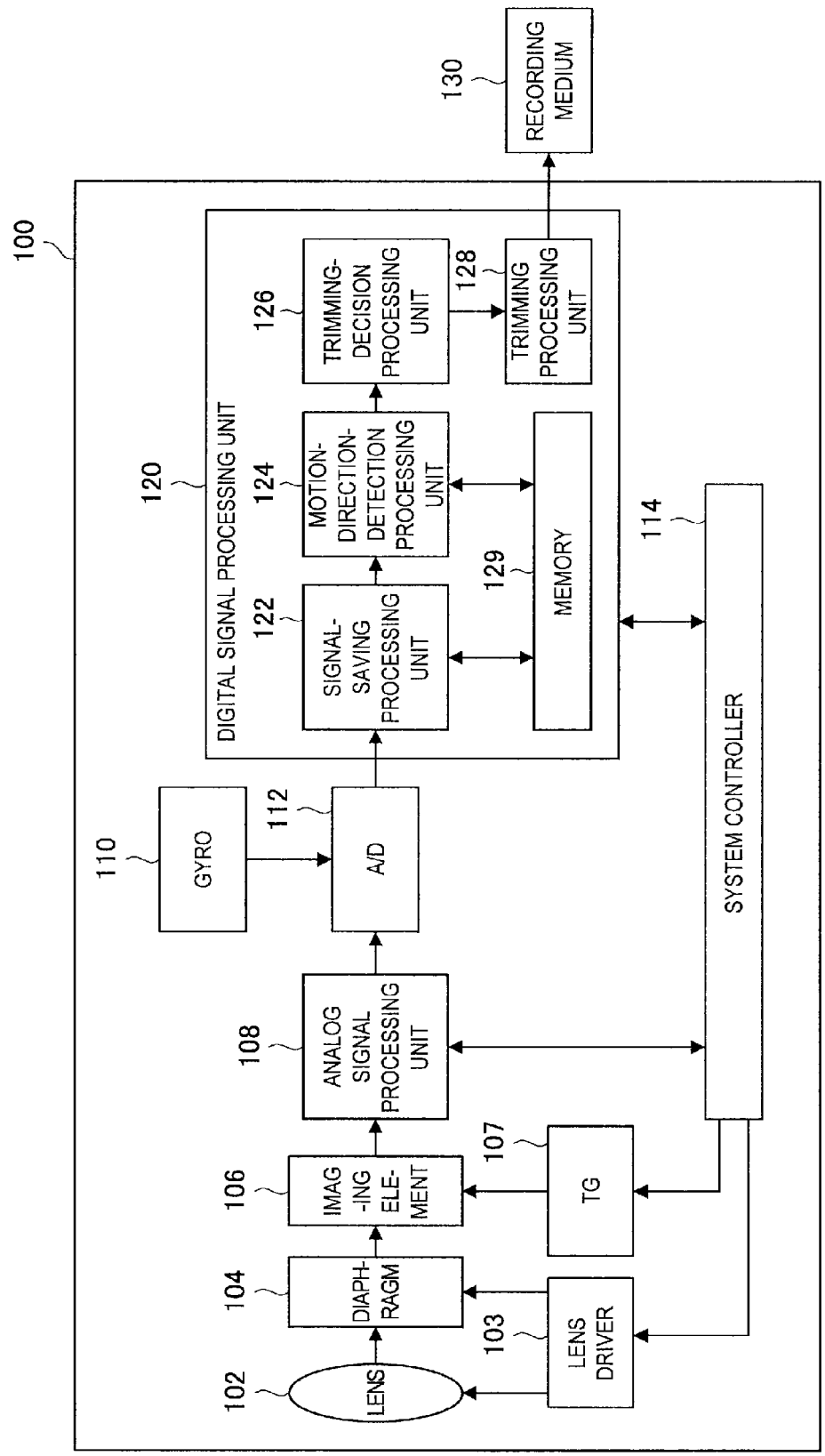

[Fig. 2]
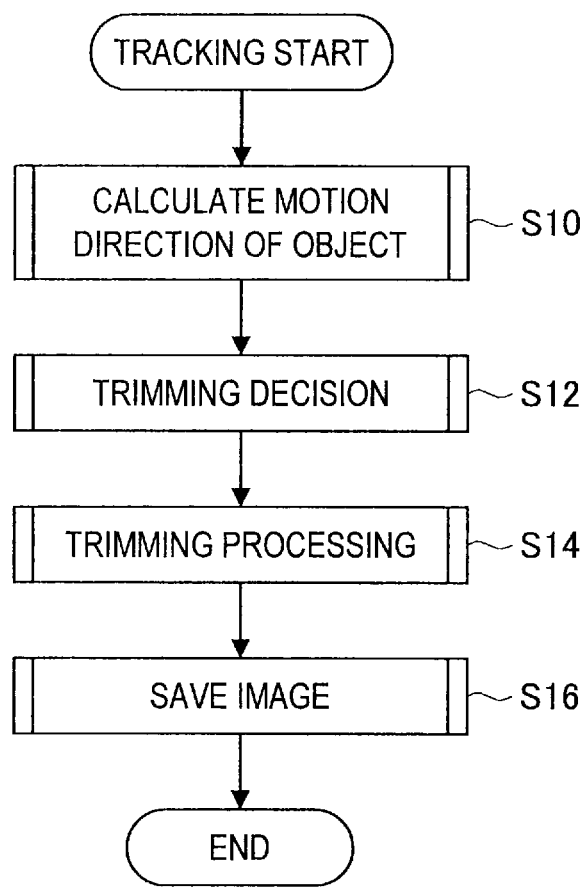

[Fig. 3]
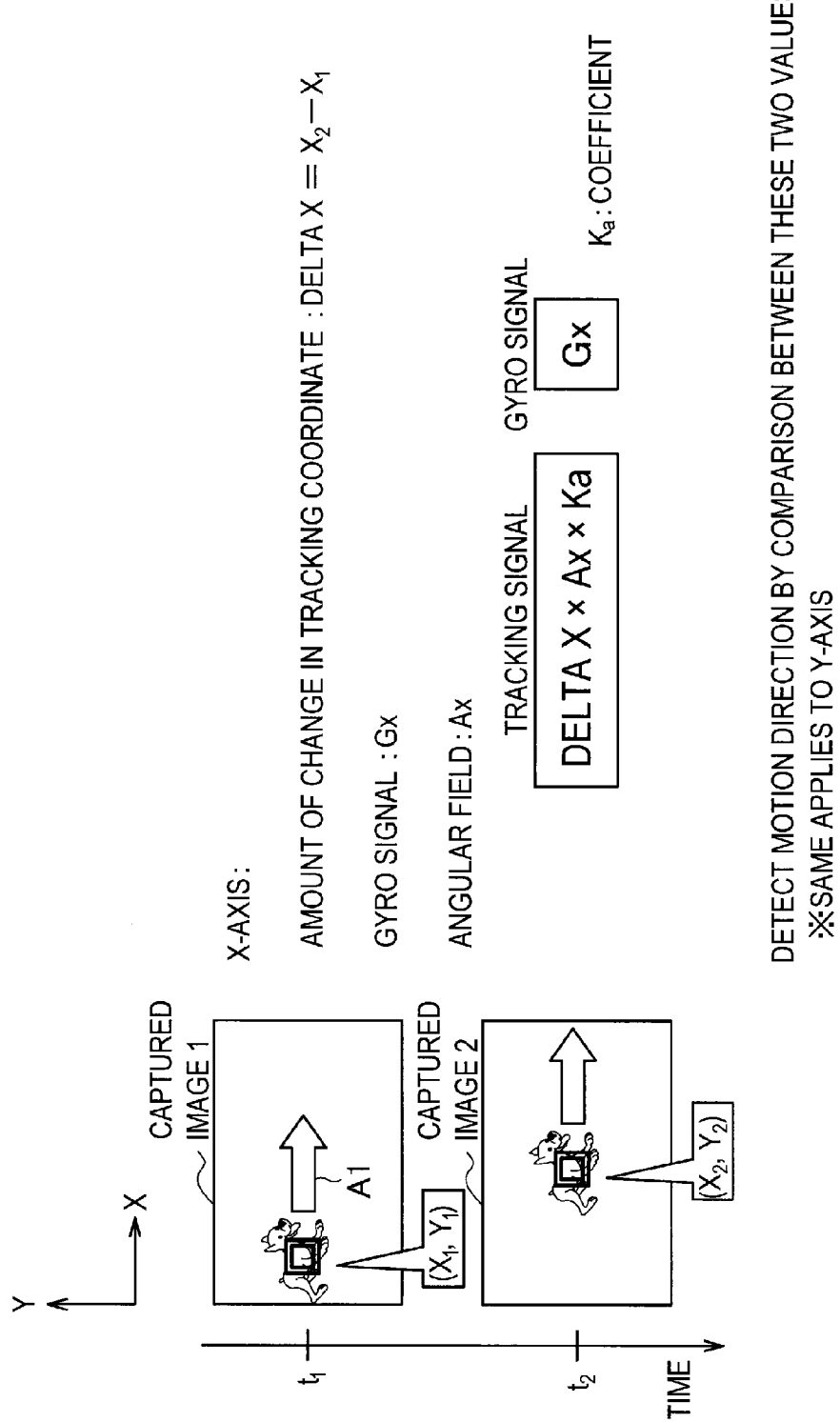

[Fig. 4]
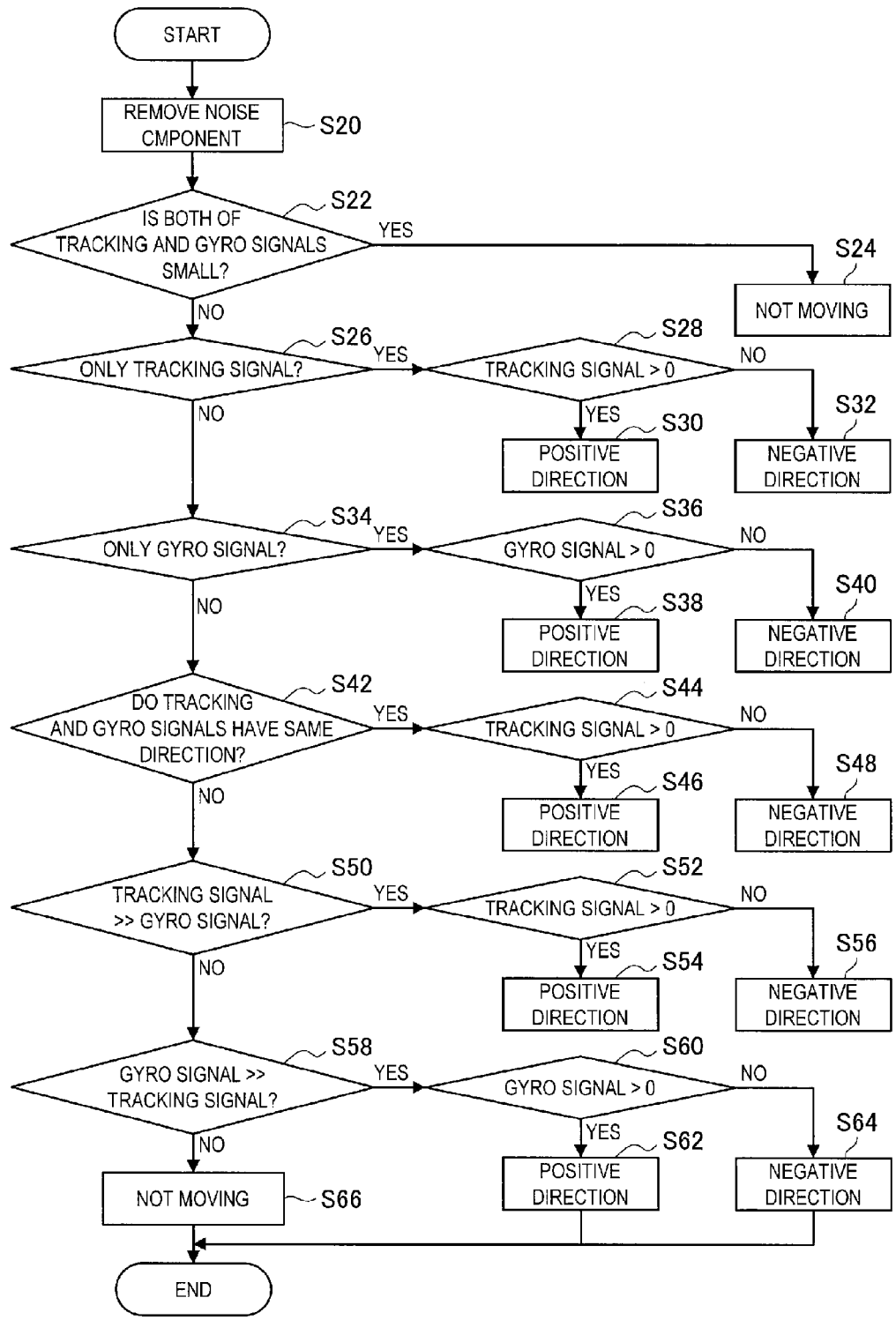

[Fig. 5]
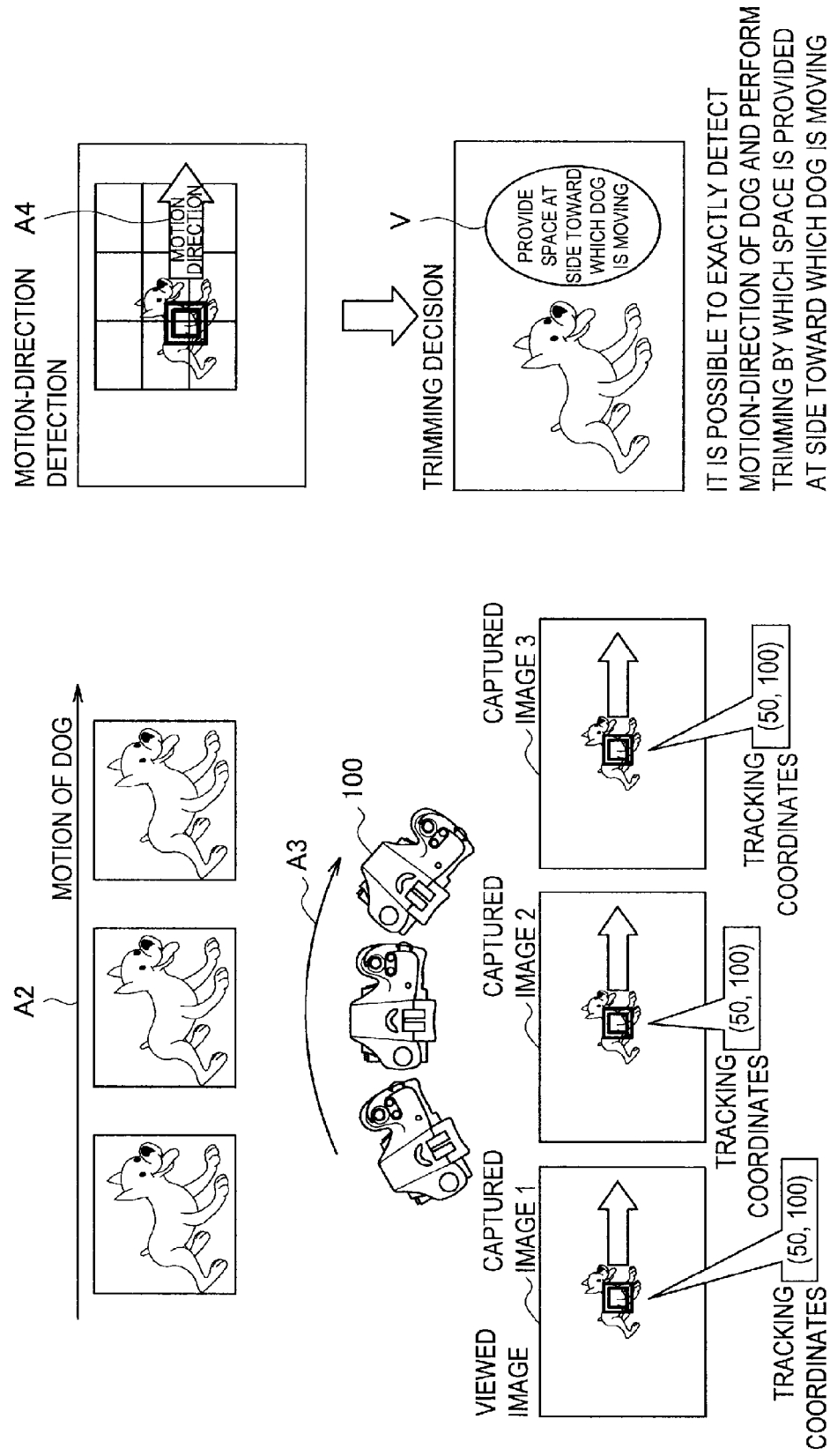

[Fig. 6]
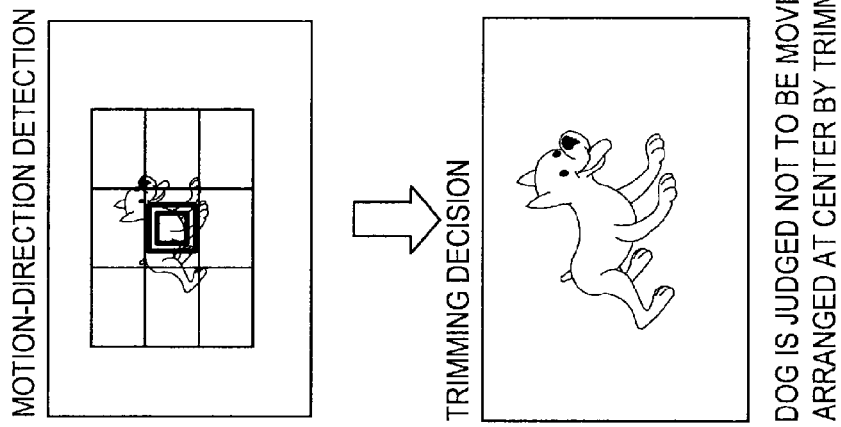
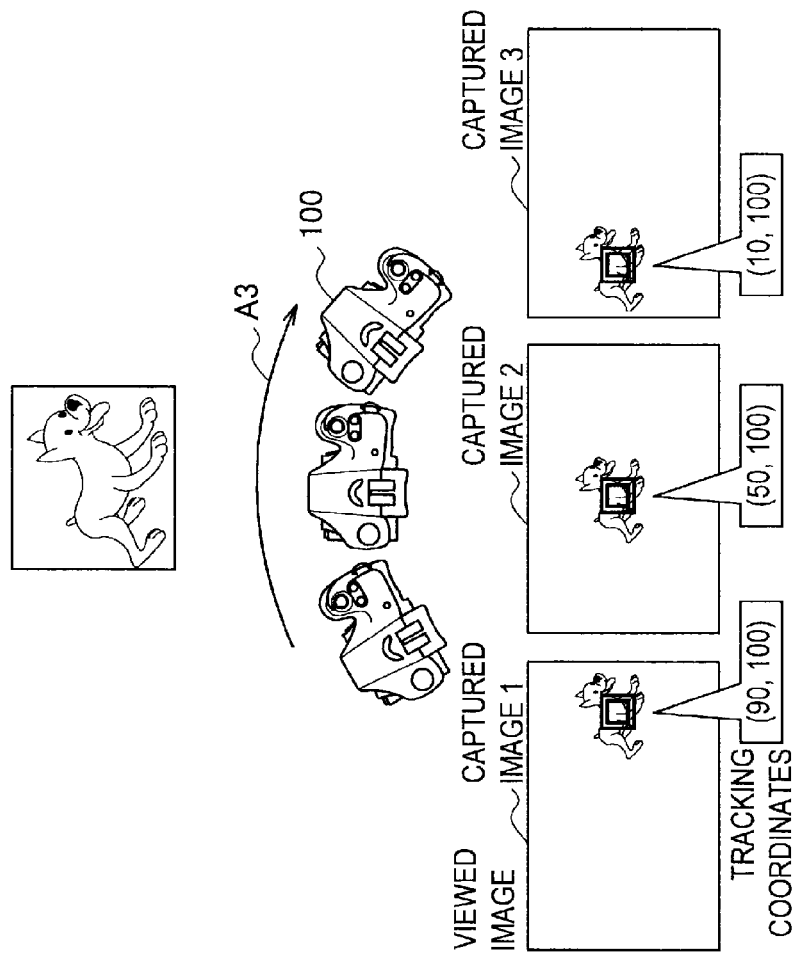

[Fig. 7]
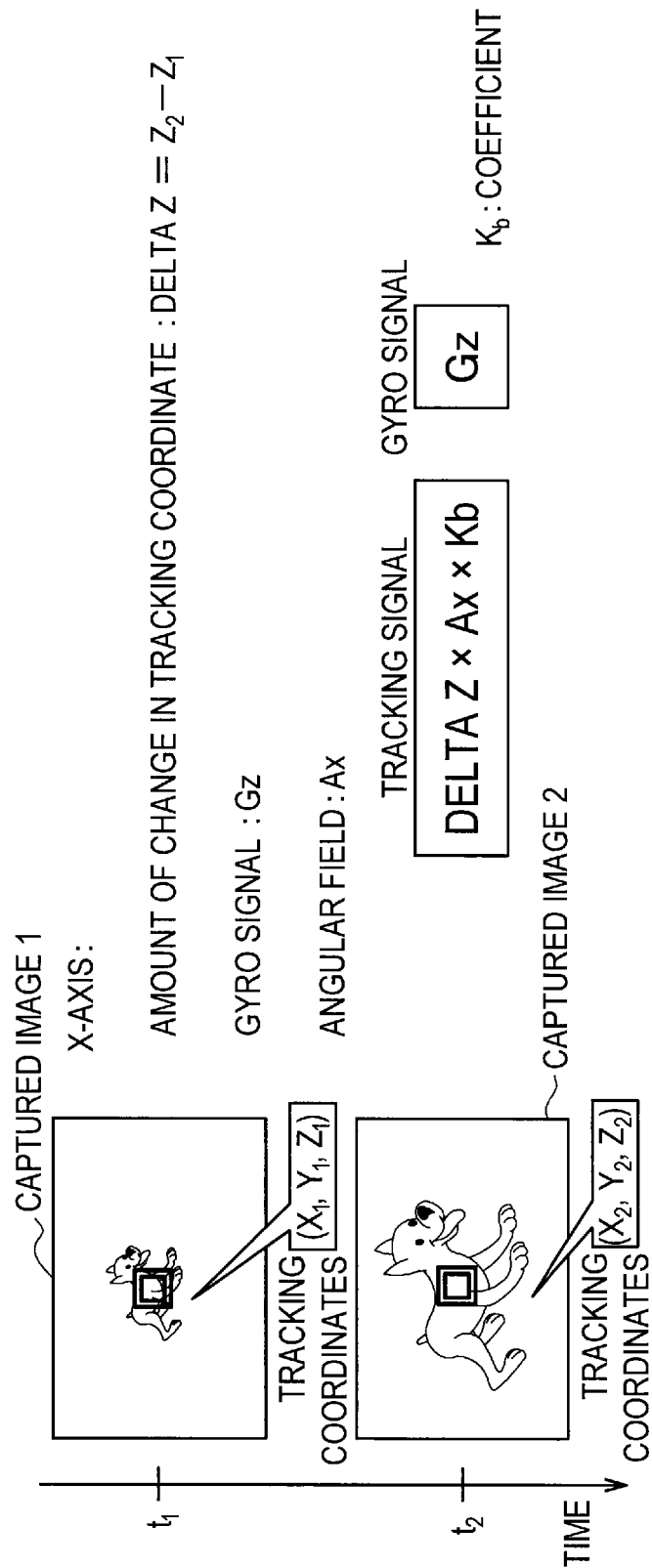

[Fig. 8]
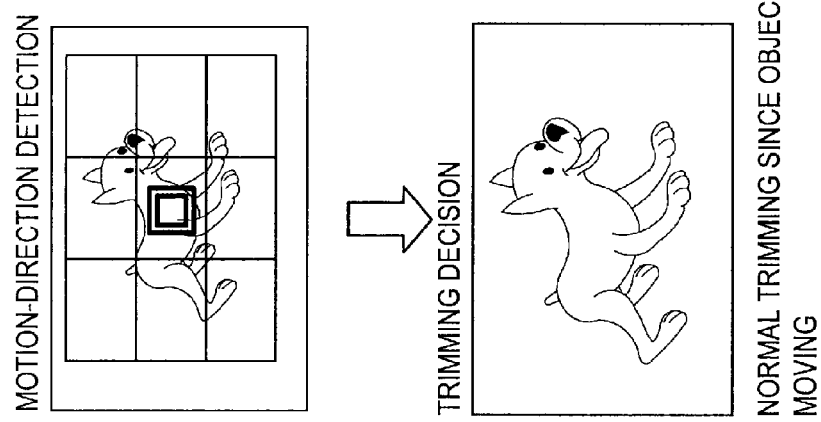
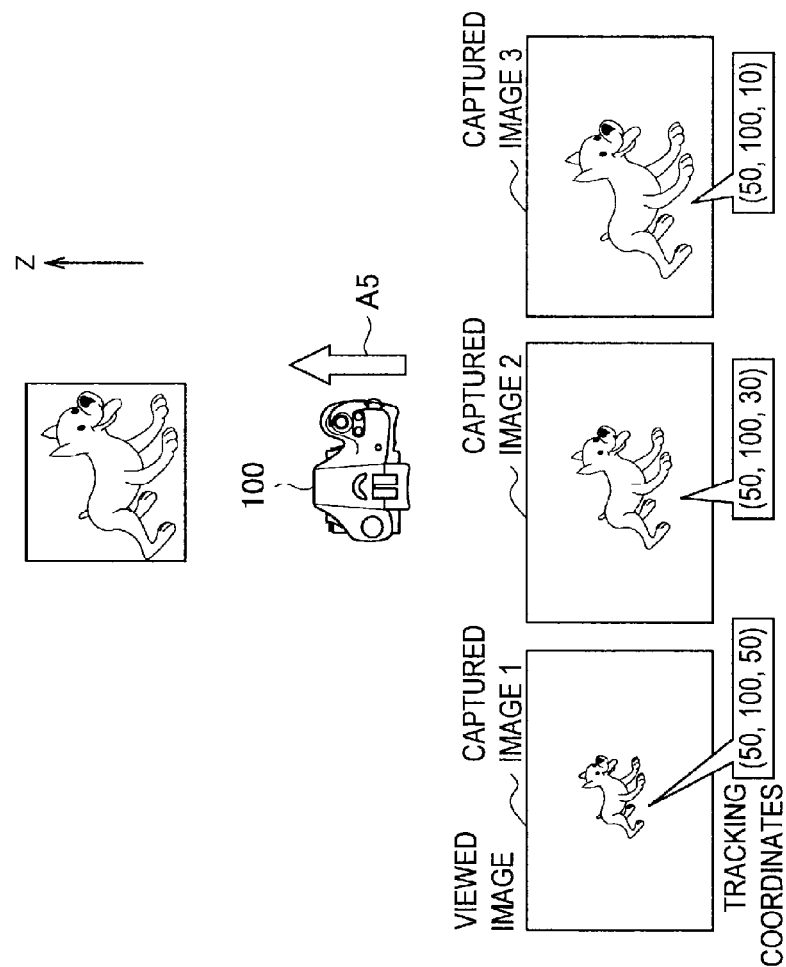

[Fig. 9]
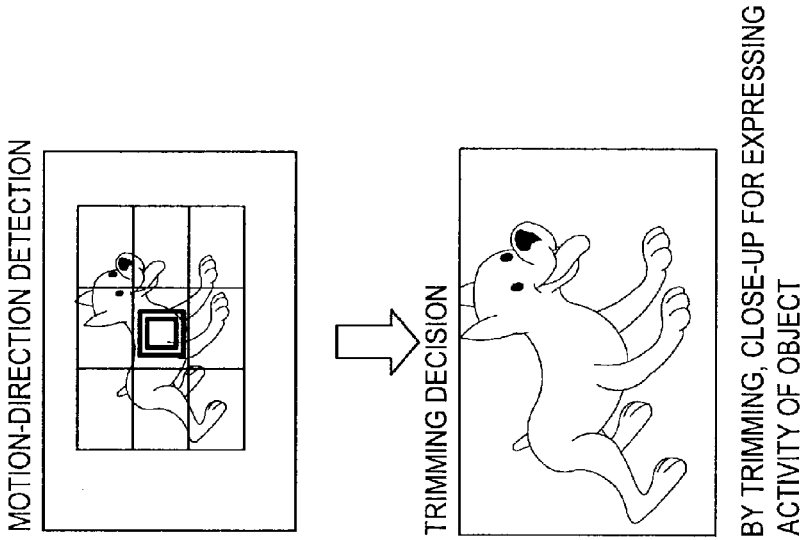
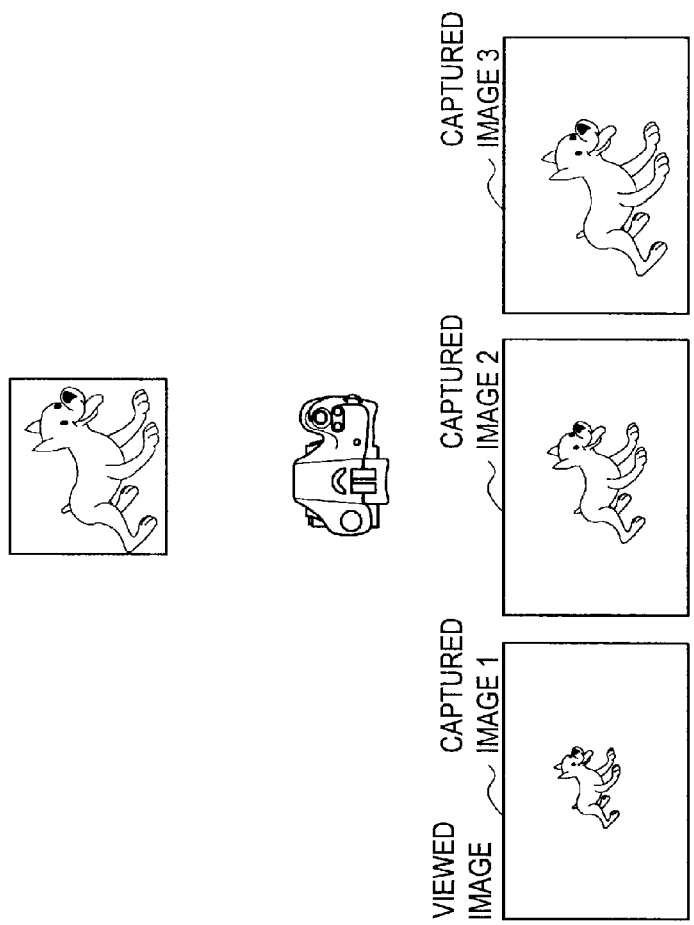

IMAGE PROCESSING DEVICE, IMAGE PROCESSING METHOD, AND RECORDING MEDIUM FOR TRIMMING AN IMAGE BASED ON MOTION INFORMATION

CROSS-REFERENCE TO RELATED APPLICATIONS

The present application claims priority from JP 2012-277953 filed Dec. 20, 2012 in the Japan Patent Office on, the entire content of which is hereby incorporated by reference.

TECHNICAL FIELD

The present disclosure relates to an image processing device, an image processing method, and a recording medium.

BACKGROUND ART

Recently, imaging apparatuses such as a digital still camera are widely prevalent, and it is possible to photograph an object using a face-detection technology, an auto focusing technology and the like. However, an adjustment of a composition at photographing depends on a user's skill, and a photographed image is not always well balanced in composition. Therefore, in recent years, there has been proposed a technology in which an extraction of a human face or an object, a tracking and others are performed, and a trimming (clipping) of it is automatically performed so as to provide a good composition.

For example, in the following Patent Literature 1, there is described a technology that is intended to provide means for easily acquiring an image with a desirable composition in view of a moving direction of an object.

CITATION LIST

Patent Literature

[PTL 1]
JP 2008-288797A

SUMMARY

Technical Problem

Some of trimmings of a tracked object are trimmings by which a space is provided at a side toward which the object is moving, as described in Patent Literature 1. However, for example, in the case where the object is moving and a user keeps capturing the object at the center of a screen while changing the orientation of his camera, since the position of the object in the screen does not change, a judgment that the object is not moving is made. In this case, since the object is judged as a not-moving object in spite of a moving object, it is difficult to perform a trimming by which a space is provided at a side toward the object is moving.

Hence, it has been desired to perform an optimal trimming in the case of tracking and photographing a moving object.

Solution to Problem

According to an embodiment of the present disclosure, an image processing apparatus may include a trimming-decision processing unit configured to determine a trimming of an image based on motion information of an object appearing in the image and motion information of the image processing apparatus.

According to an embodiment of the present disclosure, a method may include determining a trimming of an image based on motion information of an object appearing in the image and motion information of an image processing apparatus.

According to an embodiment of the present disclosure, a non-transitory computer-readable medium may be recorded with a program executable by a computer, and the program may include determining a trimming of an image based on motion information of an object appearing in the image and motion information of an image processing apparatus.

Advantageous Effects of Invention

In accordance with the present disclosure, it is possible to perform an optimal trimming in the case of tracking and photographing a moving object.

BRIEF DESCRIPTION OF DRAWINGS

FIG. 1 is a schematic view showing a schematic configuration of an imaging apparatus according to embodiments of the present disclosure.

FIG. 2 is a flowchart showing a main process that is performed in a digital signal processing unit.

FIG. 3 is a schematic view for explaining an algorithm for a motion-direction detection by a motion-direction-detection processing unit in a first embodiment.

FIG. 4 is a flowchart showing a process of the motion-direction detection in the first embodiment.

FIG. 5 is a schematic view for explaining a concrete example of the motion-direction detection in the first embodiment.

FIG. 6 is a schematic view for explaining a concrete example of the motion-direction detection in the first embodiment.

FIG. 7 is a schematic view for explaining an algorithm for a motion-direction detection by the motion-direction-detection processing unit in a second embodiment.

FIG. 8 is a schematic view for explaining a concrete example of the motion-direction detection in the second embodiment.

FIG. 9 is a schematic view for explaining a concrete example of the motion-direction detection in the second embodiment.

DESCRIPTION OF EMBODIMENTS

Preferred embodiments of the present disclosure will be described in detail below with reference to the accompanying drawings. Here, in the description and drawings, as for components having a substantially identical function and configuration, an identical reference sign is assigned, and thereby, repetitive explanations therefor are omitted.

Explanations will be made in the following order.
1. First Embodiment
  1.1. Exemplary configuration of imaging apparatus
  1.2. Main process to be performed in digital signal processing unit
  1.3. Summary of algorithm for motion-direction detection
  1.4. Process of motion-direction detection
  1.5. Concrete examples of motion-direction detection
2. Second Embodiment
  2.1. Summary of second embodiment 2.2. Summary of algorithm for motion-direction detection
2.3. Concrete examples of motion-direction detection

1. First Embodiment

1.1. Exemplary Configuration of Imaging Apparatus

First, a schematic configuration of an imaging apparatus 100 according to embodiments of the present disclosure will be explained with reference to FIG. 1. As shown in FIG. 1, the imaging apparatus 100 includes a lens 102, a lens driver 103, a diaphragm 104, an imaging element 106, a timing generator (TG) 107, an analog signal processing unit 108, a gyro sensor 110, an A/D conversion unit 112, a system controller 114, and a digital signal processing unit 120. Also, a recording medium 130 is externally connected to the imaging apparatus 100.

The digital signal processing unit 120 is configured to include, for example, a central processing unit (CPU), and includes a signal-saving processing unit 122, a motion-direction-detection processing unit 124, a trimming-decision processing unit 126, a trimming processing unit 128, and a memory 129. For example, by programs that are stored in a memory or the like, the central processing unit (CPU) can function as the components of the digital signal processing unit 120. The programs can be recorded in a memory included in the imaging apparatus 100, a memory that is externally connected to the imaging apparatus 100, or the like.

In the configuration shown in FIG. 1, an object image is formed on an imaging surface of the imaging element 106 by the lens 102. The lens 102 and the diaphragm 104 are driven by the lens driver 103. The lens driver 103 drives the lens 102 to regulate its focus and zooming (angular filed). Furthermore, the lens driver 103 drives the diaphragm to regulate the amount of light for an object.

The imaging element 106, which is a CMOS sensor, a CCD sensor or the like, performs a photoelectric conversion of the object image and then outputs it as image signals. The timing generator 107 generates timing signals in driving of the imaging element 106. The analog signal processing unit 108 performs an analog signal processing to the image signals. The gyro sensor 110 detects a motion of the imaging apparatus 100. The A/D conversion unit 112 converts the image signals, which are analog signals, into digital image data. Also, the A/D conversion unit 112 converts gyro signals, which are analog signals, into digital data.

The image data that the A/D conversion unit 112 generates by A/D conversion are transmitted to the digital signal processing unit 120. Also, the gyro signals that the A/D conversion unit 112 generates by A/D conversion are transmitted to the digital signal processing unit 120. The signal-saving processing unit 122 of the digital signal processing unit 120 performs a processing to save an image data to the memory 129. The motion-direction-detection processing unit 124 extracts a tracking signal from the image data, and detects the motion direction of the object from the tracking signal and the signal of the gyro sensor.

The trimming-decision processing unit 126 determines a trimming of the object image, based on the motion of the object. The trimming processing unit 128 performs a trimming processing, based on a decision result by the trimming-decision processing unit 126.

The system controller controls the lens driver 103, the timing generator 107, the analog signal processing unit 108, and the digital signal processing unit 120.

1.2. Main Process to be Performed in Digital Signal Processing Unit

Next, a main process to be performed in the digital signal processing unit 120 will be explained on the basis of the flowchart of FIG. 2. In step S10, firstly, a calculation of the motion direction of the object is performed. Here, the motion-direction-detection processing unit 124 in FIG. 1 detects the motion direction of the object from the tracking signal and the gyro signal. In the subsequent step S12, a decision about a trimming is performed. Here, based on the motion direction of the object, the trimming-decision processing unit 126 determines whether or not to perform a trimming, and in the case of performing a trimming, determines what trimming is performed with respect to an arrangement of a space relative to the object. In the subsequent step S14, the trimming processing unit 128 performs the trimming processing. In the subsequent step S16, an image to which the trimming processing has been performed is recorded in the recording medium 130. After step S16, the process ends.

1.3. Summary of Algorithm for Motion-Direction Detection

Next, an algorithm for the motion-direction detection by the motion-direction-detection processing unit 124 will be explained on the basis of FIG. 3. The motion-direction-detection processing unit 124 compares the tracking signal and the gyro signal, and thereby detects the motion direction of the object. The tracking signal is a value based on the amount of change in coordinates (tracking coordinates) of the object that is tracked in captured images. The tracking signal in the X-axis direction will be explained on the basis of FIG. 3. First, as the image data of the object, captured images are acquired at a predetermined time interval. Here, suppose that a captured image 1 is acquired at a time $t_1$ and a captured image 2 is acquired at a time $t_2$.

As shown in FIG. 3, in the captured images 1 and 2, a "dog" is shown as a main object. In the captured image 1, the "dog" is on the extreme left of the whole image, and the coordinates (tracking coordinates) of the "dog" are $(X_1, Y_1)$. In the captured image 2, the "dog" is shown at the center of the whole image, and the coordinates (tracking coordinates) of the "dog" are $(X_2, Y_2)$.

The motion-direction-detection processing unit 124, firstly, calculates the amount of change in the tracking coordinates. The amount of change in the tracking coordinates in the X-axis direction, deltaX, is deltaX=$X_2$-$X_1$. This deltaX represents a moving amount in the X-axis direction of the object, and therefore, by comparing this with the gyro signal Gx, it is possible to basically determine the motion direction and amount of motion (moving amount) of the object.

However, the amount of change deltaX includes a factor of focal length (angular field) of the lens 102, and, even if the amount of change deltaX is the same, the difference in the focal length of the lens 102 results in the difference in the amount of motion of the object. Therefore, for the comparison with the gyro signal Gx, the amount of change deltaX is multiplied by an angular field Ax. Furthermore, in view of factors other than focal length, the amount of change deltaX is multiplied by a predetermined coefficient Ka, along with the angular field Ax. Then, as the tracking signal, the resulting value is compared with the gyro signal Gx. Thereby, it is possible to exactly judge the motion of the object based on the comparison.

1.4. Process of Motion-Direction Detection

FIG. 4 is a flowchart showing a process of the motion-direction detection. First, in step S20, noise components are removed from the tracking signal and the gyro signal. In the subsequent step S22, whether both of the value of the tracking signal and the value of the gyro signal are small, is judged. If both of the value of the tracking signal and the value of the gyro signal are small, the process proceeds to step S24, and a judgment that the object is not moving is made.

On the other hand, in step S22, unless both of the value of the tracking signal and the value of the gyro signal are small, the process proceeds to step S26. In other words, if at least one of the value of the tracking signal and the value of the gyro signal is large, the process proceeds to step S26. In step S26, whether only the value of the tracking signal is large is judged, and if only the value of the tracking signal is large (if only the tracking signal is obtained as a valid value), the process proceeds to step S28. In step S28, whether the tracking signal is larger than 0 is judged, and if the tracking signal is larger than 0, a judgment that the object is moving in the positive direction is made (step S30). On the other hand, if the tracking signal is 0 or less (if the tracking signal is a negative value), a judgment that the object is moving in the negative direction is made (step S32). As for the positive and negative directions for the tracking signal, to take the X-axis as an example, the direction of the arrow A1 of FIG. 3 (the plus direction of the X value) is defined as the positive direction, and the direction opposite to the arrow A1 is defined as the negative direction. Similarly, as for the Y-axis, the plus direction of the Y value is defined as the positive direction. As for the gyro signal, similarly, when the imaging apparatus 100 moves in the plus direction of the X-axis of FIG. 3, the direction is defined as the positive direction and the opposite direction is defined as the negative direction.

In step S26, unless only the value of the tracking signal is large, the process proceeds to step S34. In step S34, whether only the value of the gyro signal is large is judged, and if only the value of the gyro signal is large (if only the gyro signal is obtained as a valid value), the process proceeds to step S36. Since step S36, the motion direction of the object is judged based on the gyro signal. In step S36, whether the gyro signal is larger than 0 is judged, and if the gyro signal is larger than 0, a judgment that the object is moving in the positive direction is made (step S38). On the other hand, if the gyro signal is 0 or less (if the gyro signal is a negative value), a judgment that the object is moving in the negative direction is made (step S40).

Thus, if only one of the tracking signal and the gyro signal is detected as a valid value, it is possible to judge the motion of the object based on one of the detected signal.

In step S34, unless only the value of the gyro signal is large, the process proceeds to step S42. In this case, both of the gyro signal and the tracking signal have some amount, and are detected as valid values. Therefore, in step S42, whether the gyro signal and the tracking signal have the same direction is judged, and if they have the same direction, the process proceeds to step S44. Since step S44, the motion direction of the object is judged based on the tracking signal. In step S44, whether the tracking signal is larger than 0 is judged, and if the tracking signal is larger than 0, a judgment that the object is moving in the positive direction is made (step S46). On the other hand, if the tracking signal is 0 or less (if the tracking signal is a negative value), a judgment that the object is moving in the negative direction is made (step S48).

Thus, if both of the gyro signal and the tracking signal are detected as valid values and the gyro signal and the tracking signal have the same direction, the motion direction of the object is judged based on the tracking signal. Alternatively, in this case, the motion direction of the object may be judged based on the gyro signal.

In step S42, unless the gyro signal and the tracking signal have the same direction, the process proceeds to step S50. In step S50, whether the tracking signal is remarkably larger than the gyro signal is judged, if the tracking signal is remarkably larger than the gyro signal, the process proceeds to step S52. In this case, since the gyro signal and the tracking signal have the opposite directions, and the motion of the object with the tracking signal is larger than the motion of the imaging apparatus 100 with the gyro signal, it seems that the direction of the tracking signal is the motion direction of the object. Therefore, since step S52, the motion direction of the object is judged based on the tracking signal. That is, whether the tracking signal is larger than 0 is judged, and if the tracking signal is larger than 0, a judgment that the object is moving in the positive direction is made (step S54). On the other hand, if the tracking signal is 0 or less (if the tracking signal is a negative value), a judgment that the object is moving in the negative direction is made (step S56).

In step S50, unless the tracking signal is remarkably larger than the gyro signal, the process proceeds to step S58. In step S58, whether the gyro signal is remarkably larger than the tracking signal is judged, if the gyro signal is remarkably larger than the tracking signal, the process proceeds to step S60. In this case, since the gyro signal and the tracking signal have the opposite directions, and the motion of the imaging apparatus 100 with the gyro signal is larger than the motion of the object with the tracking signal, it seems that the direction of the gyro signal is the motion direction of the object. Therefore, since step S60, the motion direction of the object is judged based on the gyro signal. That is, whether the gyro signal is larger than 0 is judged, and if the gyro signal is larger than 0, a judgment that the object is moving in the positive direction is made (step S62). On the other hand, if the gyro signal is 0 or less (if the gyro signal is a negative value), a judgment that the object is moving in the negative direction is made (step S64).

In step S58, unless the gyro signal is remarkably larger than the tracking signal, the process proceeds to step S66. In the case of proceeding to step S66, the gyro signal and the tracking signal have the opposite directions, and the gyro signal and the tracking signal have similar values. Therefore, the gyro signal and the tracking signal cancel each other out. Accordingly, in step S66, a judgment that the object is not moving is made.

1.5. Concrete Examples of Motion-Direction Detection

Next, concrete examples of the motion-direction detection will be explained on the basis of FIGS. 5 and 6. FIG. 5 shows a case where the object "dog" is moving from left to right as shown by the arrow A2, and in accordance with the motion of the "dog", the imaging apparatus 100 is turned from left to right as shown by the arrow A3. In FIG. 5, the captured images 1 to 3 are images that are captured while the imaging apparatus 100 being turned from left to right in accordance with the object, and they are shown in order of time. In this case, the orientation of the lens 102 of the imaging apparatus 100 moves in accordance with the motion of the object "dog", and therefore, the object "dog" is basically at the center in the captured images. Thereby, since the position of the "dog" does not change in the captured images, the tracking signal is approximately "0". On the other hand, since the imaging apparatus 100 moves in the plus direction of the X-axis, the gyro signal is detected as a positive value. Accordingly, this case falls under the case where a judgment that only the value of the gyro signal is large is made in step S34 of FIG. 4. Therefore, in steps S36 and S38, depending on whether the gyro signal is a positive value or a negative value, it is possible to judge whether the motion of the object is oriented in the positive direction or in the negative direction. In FIG. 5, since the imaging apparatus 100 moves in the direction of the arrow A3, the gyro signal is a positive value. Accordingly, in step S36, a judgment that the object "dog" is moving in the positive direction is made.

Therefore, although the position of the object "dog" is fixed at the center in the captured images 1 to 3, a judgment that the "dog" is moving in the direction of the arrow A4 of FIG. 5 is made. Thereby, by setting the space V shown in FIG. 5 at the side toward which the object "dog" is going, it is possible to perform a trimming by which the space V is arranged at the side toward which the "dog" is moving.

Thus, in the example of FIG. 5, the motion-direction-detection processing unit 124 performs the process of FIG. 4 and detects that the motion direction of the "dog" is the direction of the arrow A4 of FIG. 5. Then, the trimming-decision processing unit 126 determines to perform the trimming by which the space is provided at the side toward which the "dog" is moving (in the direction of the arrow A4). Based on the decision result by the trimming-decision processing unit 126, the trimming processing unit 128 performs such a trimming processing as to arrange the space V shown in FIG. 5.

FIG. 6 shows a case where the object "dog" is not moving and the imaging apparatus 100, similarly to FIG. 5, is moved in the direction of the arrow A3. In this case, similarly to FIG. 5, the gyro signal is detected as a positive value. In FIG. 6, the captured images 1 to 3 are images that are captured while the imaging apparatus 100 being turned from left to right in accordance with the object, and they are shown in order of time. Since the object "dog" moves from right to left in the captured images 1 to 3, the tracking signal is detected as a negative value. Accordingly, the case of FIG. 6 falls under the case where the gyro signal and the tracking signal both have similar large values and they have the opposite directions. Therefore, in step S42 of FIG. 4, a judgment that the gyro signal and the tracking signal do not have the same direction is made. Furthermore, since the gyro signal and the tracking signal have similar amounts, judgments of "NO" are made in both steps S50 and S58, and then the process proceeds to step S66. Therefore, since the gyro signal and the tracking signal cancel each other out, a judgment that the object "dog" is not moving is made.

Therefore, although the position of the object "dog" moves from right to left in the captured images 1 to 3, a judgment that the "dog" is actually not moving is made. Thereby, a trimming by which the object "dog" is arranged at the center of a screen is performed, without setting the space V shown in FIG. 5. Therefore, without arranging the space V depending on a motion for the "dog" that is actually not moving, it is possible to perform a natural trimming.

Thus, in the example of FIG. 6, the motion-direction-detection processing unit 124 performs the process of FIG. 4 and detects that the "dog" is not moving. Then, since the "dog" is not moving, the trimming-decision processing unit 126 determines to perform the trimming by which the "dog" is arranged at the center. Based on the decision result by the trimming-decision processing unit 126, the trimming processing unit 128 performs such a trimming processing as to arrange the "dog" at the center.

In the above-described examples, there are shown examples in which a trimming decision is performed depending on a motion in the X-axis direction of the object. Also, it is possible to perform a trimming decision depending on a motion in the Y-axis direction of the object. In addition, it is possible to perform a trimming decision depending on both motions in the X-axis and Y-axis directions of the object.

As described above, in accordance with the first embodiment, it is possible to judge a motion of an object based on the tracking signal and the gyro signal. Therefore, in the case where a user tracks and photographs an object, it is possible to exactly perform a trimming decision based on a motion of the object, even when the position of the object does not change in the screen. Accordingly, it is possible to perform an optimal trimming depending on a motion of the object.

2. Second Embodiment 2.1. Summary of Second Embodiment

Next, a second embodiment of the present disclosure will be explained. In the second embodiment, in the case where an object moves in the depth direction, a motion in the depth direction is judged and an optimal trimming is performed. In the case where an object moves in the depth direction, similarly to the first embodiment, a motion direction in the depth direction of an object is detected, and a trimming decision is performed. On this occasion, a judgment for a motion direction of an object can be performed in accordance with the process of FIG. 4, which is explained in the first embodiment.

2.2. Summary of Algorithm for Motion-Direction Detection

An algorithm for the motion-direction detection by the motion-direction-detection processing unit 124 will be explained below on the basis of FIG. 7. Similarly to the first embodiment, the motion-direction-detection processing unit 124 compares the tracking signal and the gyro signal, and thereby detects the motion direction of the object. First, as the image data of the object, captured images are acquired at a predetermined time interval. Here, suppose that a captured image 1 is acquired at a time $t_1$ and a captured image 2 is acquired at a time $t_2$.

Similarly to FIG. 3, in the captured images 1 and 2, a "dog" is shown as a main object. In the captured image 1, the "dog" is at the center of the whole image, and the coordinates (tracking coordinates) of the "dog" are $(X_1, Y_1, Z_1)$. In the captured image 2, also, the "dog" is shown at the center of the whole image, and the coordinates (tracking coordinates) of the "dog" are $(X_2, Y_2, Z_2)$.

The motion-direction-detection processing unit 124, firstly, calculates the amount of change in the tracking coordinates. The amount of change in the tracking coordinates in the Z-axis direction, deltaZ, is deltaZ=$Z_2$-$Z_1$. This deltaZ represents a moving amount in the Z-axis direction of the object, and therefore, by comparing this with the gyro signal Gz, which represents a motion in the Z-axis direction of the imaging apparatus 100, it is possible to basically determine the motion direction and amount of motion (moving amount) of the object.

However, similarly to the first embodiment, the amount of change deltaZ includes a factor of focal length (angular field) of the lens 102, and, even if the amount of change deltaZ is the same, the difference in the focal length of the lens 102 results in the difference in the amount of motion of the object. Therefore, for the comparison with the gyro signal Gz, the amount of change deltaZ is multiplied by the angular field Ax. Furthermore, in view of factors other than focal length, the amount of change deltaZ is multiplied by a predetermined coefficient Kb, along with the angular field Ax. Then, as the tracking signal, the resulting value is compared with the gyro signal Gz. Thereby, it is possible to exactly judge the motion of the object based on the comparison. The judgment for the motion direction by the comparison between the tracking signal and the gyro signal can be performed in a similar manner to the process of FIG. 4.

2.3. Concrete Examples of Motion-Direction Detection

Concrete examples of the motion-direction detection in the second embodiment will be explained below on the basis of FIGS. 8 and 9. FIG. 8 shows a case where the object "dog" is not moving, and the imaging apparatus 100 comes close to the object as shown by the arrow A5. The motion-direction-detection processing unit 124 detects, as the tracking coordinates, a position (a Z coordinate) in the depth direction of the object in addition to an X coordinate and Y coordinate, to determine the tracking signal. As shown in FIG. 8, the direction from the imaging apparatus 100 toward the object is defined as the positive direction of the Z-axis.

In this case, since the object "dog" is not moving but the imaging apparatus 100 moves in the direction to come close to the object, the tracking signal determined from the captured images is a negative value. On the other hand, since the imaging apparatus 100 moves in the plus direction of the Z-axis, the gyro signal is detected as a positive value. Therefore, in this case, a judgment that the gyro signal and the tracking signal do not have the same direction is made in step S42 of FIG. 4. Furthermore, since the gyro signal and the tracking signal have similar amounts, judgments of "NO" are made in both steps S50 and S58, and then the process proceeds to step S66. Accordingly, since the gyro signal and the tracking signal cancel each other out, a judgment that the object "dog" is not moving in the Z-axis direction is made.

Therefore, although the position of the object "dog" moves from the back side to the near side in the captured images 1 to 3, a judgment that the "dog" is actually not moving is made. Thereby, since the object is not moving, a normal trimming is performed. Therefore, without performing a trimming depending on a motion for the "dog" that is actually not moving in the depth direction, it is possible to perform a natural trimming.

Thus, in the example of FIG. 8, the motion-direction-detection processing unit 124 performs the process of FIG. 4 and detects that the "dog" is not moving. Then, since the "dog" is not moving, the trimming-decision processing unit 126 determines to perform a normal trimming Based on the decision result by the trimming-decision processing unit 126, the trimming processing unit 128 performs the trimming processing.

FIG. 9 shows a case where the object "dog" is moving toward the imaging apparatus 100 and the imaging apparatus 100 is not moving. In this case, since the object "dog" is moving in the direction to come close to the imaging apparatus 100, the tracking signal determined from the captured images is a negative value. On the other hand, since the imaging apparatus 100 is not moving, the gyro signal is "0". Accordingly, this case falls under the case where only the tracking signal is detected in step S26 of FIG. 4, and in the process since step S28, the motion direction of the object is judged based on whether the value of the tracking signal is negative or positive.

In the example shown in FIG. 9, since the tracking signal is a negative value, a judgment that the object is moving in the minus direction of the Z-axis, in other words, in the direction to come close to the imaging apparatus 100, is made. Therefore, as shown in FIG. 9, a trimming by which the object is taken in close-up is performed for accentuating the dynamism of the object.

Thus, in the example of FIG. 9, the motion-direction-detection processing unit 124 performs the process of FIG. 4 and detects that the motion direction of the "dog" is the minus direction of the Z-axis. Then, since the motion direction of the "dog" is the direction to come close to the imaging apparatus 100, the trimming-decision processing unit 126 performs such a trimming as to take the object in close-up for expressing the dynamism of the object.

In the above-described examples, there are shown examples in which a trimming decision is performed depending on a motion in the Z-axis direction of the object. Also, it is possible to perform a trimming decision depending on all motions in the X-axis, Y-axis and Z-axis directions, in combination with the first embodiment.

As explained above, in accordance with the second embodiment, it is possible to judge a motion in the depth direction of an object based on the tracking signal and the gyro signal. Accordingly, it is possible to perform an optimal trimming depending on a motion in the Z-axis direction of an object.

So far, the preferred embodiments of the present disclosure have been described in detail with reference to the accompanying drawings. The technical scope of the present disclosure is not limited to the examples. It is obvious that various modifications and alterations may readily occur to those ordinarily skilled in the art within the scope of the technical idea described in the appended claims, and it should be understood that they also fall within the technical scope of the present disclosure.

Additionally, the present technology may also be configured as below.

(1)
An image processing apparatus including:
a trimming-decision processing unit configured to determine a trimming of an image based on motion information of an object appearing in the image and motion information of the image processing apparatus.

(2) The image processing apparatus according to (1), wherein the trimming-decision processing unit is configured to determine what type of trimming is performed with respect to an arrangement of a space relative to the object in response to a determination to perform a trimming.

(3) The image processing apparatus according to either (1) or (2) including a motion-direction-detection processing unit configured to determine the motion information of the object.

(4) The image processing apparatus according to (3), wherein the motion-direction-detection processing unit is configured to extract a tracking signal from the image.

(5) The image processing apparatus according to (4), wherein the tracking signal is determined based on a focal length factor.

(6) The image processing apparatus according to (3), wherein the motion-direction-detection processing unit is configured to receive a gyro signal.

(7) The image processing apparatus according to (3), wherein the motion-direction-detection processing unit detects motion information in X-axis and Y-axis directions of the image.

(8) The image processing apparatus according to (3), wherein the motion-direction-detection processing unit detects motion information in the Z-axis direction of the image.

(9) The image processing apparatus according to any one of (1) to (8), wherein the trimming-decision processing unit is configured to determine that the object is moving when either the motion information of the object appearing in the image or the motion information of the image processing apparatus has a valid value.

(10) The image processing apparatus according to any one of (1) to (9), wherein the trimming-decision processing unit is configured to determine that the object is moving according to one of the motion information of the object appearing in the image and the motion information of the image processing apparatus when an amount of motion indicated by one of the motion information of the object appearing in the image and the motion information of the image processing apparatus is larger than an amount of motion indicated by another one of the motion information of the object appearing in the image and the motion information of the image processing apparatus.

(11) The image processing apparatus according to any one of (1) to (10), wherein the trimming-decision processing unit is configured to determine that the object is not moving when a direction indicated by the motion information of the object appearing in the image is opposite to a direction indicated by the motion information of the image processing apparatus and both an amount of motion indicated by the motion information of the object appearing in the image and an amount of motion indicated by the motion information of the image processing apparatus have similar values.

(12) The image processing apparatus according to any one of (1) to (11) including a trimming processing unit configured to perform trimming processing based on a decision result of the trimming-decision processing unit.

(13) The image processing apparatus according to any one of (1) to (12), wherein the motion information of the image processing apparatus is determined using a gyro sensor.

(14) The image processing apparatus according to any one of (1) to (13), wherein trimming of the object image is performed to arrange the object at the center of the image.

(15) The image processing apparatus according to any one of (1) to (14), wherein trimming of the object image is performed to provide space at a side toward which the object is moving.

(16) The image processing apparatus according to any one of (1) to (15), wherein trimming of the object image is performed such that the object appears to be close-up.

(17) The image processing apparatus according to any one of (1) to (16), wherein the image processing apparatus further comprises an imaging element configured to capture the object image.

(18) The image processing apparatus according to any one of (1) to (17), wherein the trimming-decision processing unit is implemented by a central processing unit.

(19) A method including determining a trimming of an image based on motion information of an object appearing in the image and motion information of an image processing apparatus.

(20) A non-transitory computer-readable medium recorded with a program executable by a computer, and the program including determining a trimming of an image based on motion information of an object appearing in the image and motion information of an image processing apparatus.

Additionally, the present technology may also be configured as below.

(1)
An image processing device including:
a motion-detection processing unit detecting a motion of an object from information relevant to the motion of the object obtained from a captured image and information relevant to a motion of an imaging apparatus; and
a trimming-decision processing unit performing a trimming decision for the captured image, based on the motion of the object.

(2)
The image processing device according to (1), further including a trimming processing unit performing a trimming processing of the captured image, based on the trimming decision.

(3)
The image processing device according to (1), wherein the information relevant to the motion of the object includes a tracking coordinate of the object in the captured image.

(4)
The image processing device according to (3), wherein the information relevant to the motion of the object is a value resulting from multiplying the tracking coordinate by a coefficient that depends on an angular field of an imaging lens.

(5)
The image processing device according to (1), wherein the trimming-decision processing unit performs the trimming decision so that a space is provided at a side toward which the object is moving.

(6)
The image processing device according to (1), wherein, in a case where the object is not moving, the trimming-decision processing unit determines not to perform a trimming that depends on the motion of the object.

(7)
The image processing device according to (1), wherein, in a case where based on a result of a comparison between the information relevant to the motion of the object and the information relevant to the motion of the imaging apparatus, the motion of the object and the motion of the imaging apparatus are oriented in opposite directions and are same in amount, the motion-detection processing unit detects that the object is not moving.

(8)
The image processing device according to claim 1, wherein, in a case where based on a result of a comparison between the information relevant to the motion of the object and the information relevant to the motion of the imaging apparatus, the motion of the object and the motion of the imaging apparatus are oriented in opposite directions and an amount of one of the motions is larger than an amount of the other of the motions, the motion-detection processing unit detects the motion of the object, based on the direction of the motion with larger amount.

(9)
The image processing device according to (1), wherein, in a case where only one of the information relevant to the motion of the object and the information relevant to the motion of the imaging apparatus is detected, the motion-detection processing unit detects the motion of the object, based on the detected information.

(10)
The image processing device according to (1), wherein the information relevant to the motion of the object and the information relevant to the motion of the imaging apparatus are information relevant to a motion in two-dimensional directions of the captured image.

(11)
The image processing device according to (1), wherein the information relevant to the motion of the object and the information relevant to the motion of the imaging apparatus are information relevant to a motion in a depth direction of the captured image.

(12)
An image processing method including:
detecting a motion of an object from information relevant to the motion of the object obtained from a captured image and information relevant to a motion of an imaging apparatus; and
performing a trimming decision for the captured image, based on the motion of the object.

(13)
A recording medium storing a program that that causes a computer to function as:
a unit configured to detect a motion of an object from information relevant to the motion of the object obtained from a captured image and information relevant to a motion of an imaging apparatus; and
a unit configured to perform a trimming decision for the captured image, based on the motion of the object.

REFERENCE SIGNS LIST 100 imaging apparatus
124 motion-direction-detection processing unit
126 trimming-decision processing unit
128 trimming processing unit

The invention claimed is:
1. An image processing apparatus, comprising:
an imaging element configured to capture an image; and
a central processing unit (CPU) configured to:
   determine that a motion of an object that appears in the image is in one of a first direction or a second direction based on a first comparison of first motion information of the object in the image with a first threshold value or based on a second comparison of second motion information of the image processing apparatus with a second threshold value; and
   determine a trimming process based on one of the first direction or the second direction of the motion of the object in the image.
2. The image processing apparatus of claim 1,
wherein the CPU is further configured to determine a type of the trimming process with respect to an arrangement of a space relative to the object in the image based on the determination of the trimming process.
3. The image processing apparatus of claim 1,
wherein the CPU is further configured to determine the first motion information of the object based on a direction of movement of the object detected from a tracking signal.
4. The image processing apparatus of claim 3,
wherein the CPU is further configured to extract the tracking signal from the image.
5. The image processing apparatus of claim 4,
wherein the CPU is further configured to determine the tracking signal based on a focal length of a lens included in the image processing apparatus.
6. The image processing apparatus of claim 3,
wherein the CPU is further configured to receive a gyro signal.
7. The image processing apparatus of claim 3,
wherein the CPU is further configured to detect the first motion information or the second motion information in at least one of an X-axis direction or a Y-axis direction of the image.
8. The image processing apparatus of claim 3,
wherein the CPU is further configured to detect the first motion information or the second motion information in a Z-axis direction of the image.
9. The image processing apparatus of claim 1,
wherein the CPU is further configured to determine that the object is in motion based on the first motion information of the object in the image or the second motion information of the image processing apparatus that has a value larger than a third threshold.
10. The image processing apparatus of claim 1,
wherein the CPU is further configured to determine the object is in motion based on an amount of motion indicated by one of the first motion information or the second motion information.
11. The image processing apparatus of claim 1,
wherein the CPU is further configured to determine that the object is stationary based on a determination that the first direction indicated by the first motion information is opposite to the second direction indicated by the second motion information, and both a first amount of motion indicated by the first motion information and a second amount of motion indicated by the second motion information have similar values.
12. The image processing apparatus of claim 1,
wherein the CPU is further configured to execute the trimming process based on a third direction of movement of the object.
13. The image processing apparatus of claim 1,
wherein the CPU is further configured to determine the second motion information of the image processing apparatus based on a signal from a gyro sensor.
14. The image processing apparatus of claim 1,
wherein the CPU is further configured to execute the trimming process of the image to arrange the object at a center of the image.
15. The image processing apparatus of claim 1, wherein the CPU is further configured to execute the trimming process of the image to set a space at a side of the image in a direction of movement of the object.
16. The image processing apparatus of claim 1,
wherein the CPU is further configured to execute the trimming process of the image such that the object is captured as a close-up shot.
17. A method, comprising:
capturing an image by an image processing apparatus; and
determining that a motion of an object that appears in the image is in one of a first direction or a second direction based on a first comparison of first motion information of the object in the image with a first threshold value or based on a second comparison of second motion information of the image processing apparatus with a second threshold value; and
determining a trimming process for the image based on one of the first direction or the second direction of the motion of the object in the image.
18. A non-transitory computer-readable medium having stored thereon, computer-executable instructions for causing an image processing apparatus to execute operations, the operations comprising:
capturing an image by the image processing apparatus; and
determining a that a motion of an object that appears in the image is in one of a first direction or a second direction based on a first comparison of first motion information of the object in the image with a first threshold value or based on a second comparison of second motion information of the image processing apparatus with a second threshold value; and determining a trimming process based on one of the first direction or the second direction of the motion of the object in the image.

19. The image processing apparatus of claim 1, wherein the first threshold value is equal to the second threshold value.

20. The image processing apparatus of claim 1, wherein based on a determination that the second motion information has an invalid value, the CPU is further configured to determine that the motion of the object is in one of the first direction or the second direction based on the first motion information; and based on a determination that the first motion information has the invalid value, the CPU is further configured to determine that the motion of the object is in one of the first direction or the second direction based on the second motion information.

* * * * *